US011132596B2

(12) United States Patent
Khojastepour

(10) Patent No.: US 11,132,596 B2
(45) **Date of Patent: *Sep. 28, 2021**

(54) PRODUCT TAGGING AND RFID LOCALIZATION

(71) Applicant: NEC Laboratories America, Inc., Princeton, NJ (US)

(72) Inventor: Mohammad Khojastepour, Lawrenceville, NY (US)

(73) Assignee: NEC Corporation

( * ) Notice: Subject to any disclaimer, the term of this patent is extended or adjusted under 35 U.S.C. 154(b) by 0 days.

This patent is subject to a terminal disclaimer.

(21) Appl. No.: 16/848,235

(22) Filed: Apr. 14, 2020

(65) Prior Publication Data

US 2020/0334424 A1 Oct. 22, 2020

Related U.S. Application Data

(63) Continuation of application No. 16/825,395, filed on Mar. 20, 2020, now Pat. No. 10,997,488.

(Continued)

(51) Int. Cl.
*H04Q 5/22* (2006.01)
*G06K 19/077* (2006.01)

(Continued)

(52) U.S. Cl.
CPC ... *G06K 19/07773* (2013.01); *G06K 7/10099* (2013.01); *G06K 7/10366* (2013.01);

(Continued)

(58) Field of Classification Search
CPC ......... G06K 19/07773; G06K 7/10099; G06K 19/0672; G06K 7/10366; G06K 7/10356; G06K 7/10029; H04W 4/35; H01Q 1/2216

(Continued)

(56) References Cited

U.S. PATENT DOCUMENTS

2020/0334513 A1* 10/2020 Khojastepour .... G06K 7/10366

OTHER PUBLICATIONS

Carneiro et al., "Supervised Learning of Semantic Classes for Image Annotation and Retrieval", IEEE Transactions on Pattern Analysis and Machine Intelligence, Mar. 2007, pp. 394-410, vol. 29, No. 3.

(Continued)

*Primary Examiner* — Tanmay K Shah
(74) *Attorney, Agent, or Firm* — Joseph Kolodka

(57) ABSTRACT

A product tagging system is provided that includes at least one RF backscatter transmitter configured to emit a Radio Frequency (RF) signal on a frequency. The system includes a plurality of passive RF backscatter tags, each associated with a respective product and configured to backscatter a reply in response to a transmission from the transmitter. The system includes at least one RF backscatter receiver configured to read data for the respective product by detecting a distributed ambient backscatter signal generated by backscattering the RF signal by a corresponding one of the tags. The at least one RF backscatter receiver includes at least two antennas for performing Simultaneous Multi-Port reception (SMP) by receiving respective distributed ambient backscatter signals from a same one of the tags responsive to a same one of the RF signal being transmitted thereto. Each of the transmitter and receiver include a respective synchronized clock for the SMP.

20 Claims, 5 Drawing Sheets

Related U.S. Application Data

(60) Provisional application No. 62/836,131, filed on Apr. 19, 2019.

(51) Int. Cl.
*G06K 7/10* (2006.01)
*H01Q 1/22* (2006.01)
*H04W 4/35* (2018.01)
*G06K 19/067* (2006.01)

(52) U.S. Cl.
CPC ....... *G06K 19/0672* (2013.01); *H01Q 1/2216* (2013.01); *H04W 4/35* (2018.02)

(58) Field of Classification Search
USPC ........................................................ 340/10.4
See application file for complete search history.

(56) References Cited

OTHER PUBLICATIONS

Ma et al., Minding the Billions: Ultra-wideband Localization for Deployed RFID Tags, MobiCom'17, Oct. 2017, pp. 248-260.

* cited by examiner

PRODUCT TAGGING AND RFID LOCALIZATION

RELATED APPLICATION INFORMATION

This application claims priority to U.S. patent application Ser. No. 16/825,395 filed on Mar. 20, 2020 which claims priority to U.S. Provisional Application No. 62/836,131, filed on Apr. 19, 2019, the contents of which are incorporated herein by reference in their entirety.

BACKGROUND

Technical Field

The present invention relates to object detection and more particularly to product tagging and RFID localization.

Description of the Related Art

Radio Frequency Identification (RFID) technology can be used in variety of applications such as inventory, tracking, localization, checkout, etc. Many verticals may benefit from these range of applications such as retail, home use, public services, libraries, transportation, warehouses, and so forth. There is an inherent fundamental limitation in the way that the current RFID system communicate with an RFID tags and in particular passive RFID tags. The limitation arises from the fact that by increasing the number of the tags that are in the range of a given reader, their replies will interfere and would cause mis-detection. Even though a collision avoidance scheme is considered in standards such as the RFID Gen II Standard, in areas with large population of RFID tags, not only the replies become more delayed from the tags, the collision still causes some tags to remain hidden from the interrogator. Hence, there is a need for an approach for crowded RFID reading.

SUMMARY

According to aspects of the present invention, a product tagging system is provided. The product tagging system includes at least one RF backscatter transmitter configured to emit a Radio Frequency (RF) signal on a frequency. The product tagging system further includes a plurality of passive RF backscatter tags, each associated with a respective product and configured to backscatter a reply in response to a transmission from the at least one RF backscatter transmitter. The product tagging system also includes at least one RF backscatter receiver configured to read data for the respective product by detecting a distributed ambient backscatter signal generated by backscattering the RF signal by a corresponding one of the plurality of passive RF backscatter tags. The at least one RF backscatter receiver includes at least two antennas for performing Simultaneous Multi-Port reception (SMP) by receiving respective distributed ambient backscatter signals from a same one of the plurality of passive RF backscatter tags responsive to a same one of the RF signal being transmitted thereto. Each of the at least one RF backscatter transmitter and the at least one RF backscatter receiver include a respective synchronized clock for the SMP.

According to other aspects of the present invention, a method of localizing an RFID tag is provided. The method includes transmitting, by at least one Radio Frequency (RF) backscatter transmitter, a RF signal. The method further includes receiving, by a plurality of RF backscatter receivers, a backscattered signal from a passive RF backscatter tag. At least one of the plurality of RF backscatter receivers and the at least one RF backscatter transmitter are phase synchronized. At least two receive antennas are arranged at different locations for performing Simultaneous Multi-Port reception (SMP) by receiving respective distributed ambient backscatter signals from the passive RF backscatter tag responsive to a same one of RF signals being transmitted thereto. The at least one RF backscatter transmitter and at least one of the plurality of RF backscatter receivers include a respective synchronized clock for the SMP.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to product tagging and RFID localization.

One or more embodiments of the present invention involve spatial reuse, time splitting, and simultaneous reading from multiple ports (that is, Simultaneous Multi-Port reception (SMP)). The main idea of spatial reuse is to split an encountered volume into smaller volumes where each smaller volume is covered by a given antenna. Implementations of this approach require controlling the power transmitted from each antenna port. The idea of time splitting is similar, yet is more sophisticated in the way that it can be achieved. While increasing the number of antennas and controlling the transmit power can potentially partition a bigger volume to smaller chunks where each chunk has limited number of RFID tags, the same approach cannot achieve time-splitting which means that we would like to enable replies only from a certain chunk of the tags in a given time interval. The time splitting technique may be realized though using hardware filtering, where only a set of tags with a particular structure may respond to interrogation from the RFID reader.

The terms “RF backscatter transmitter” and “RF transmit chain” are used interchangeably herein. Moreover, the terms "RF backscatter receiver" and "RF receive chain" and "RFID reader" are used interchangeably herein.

Figure 1:
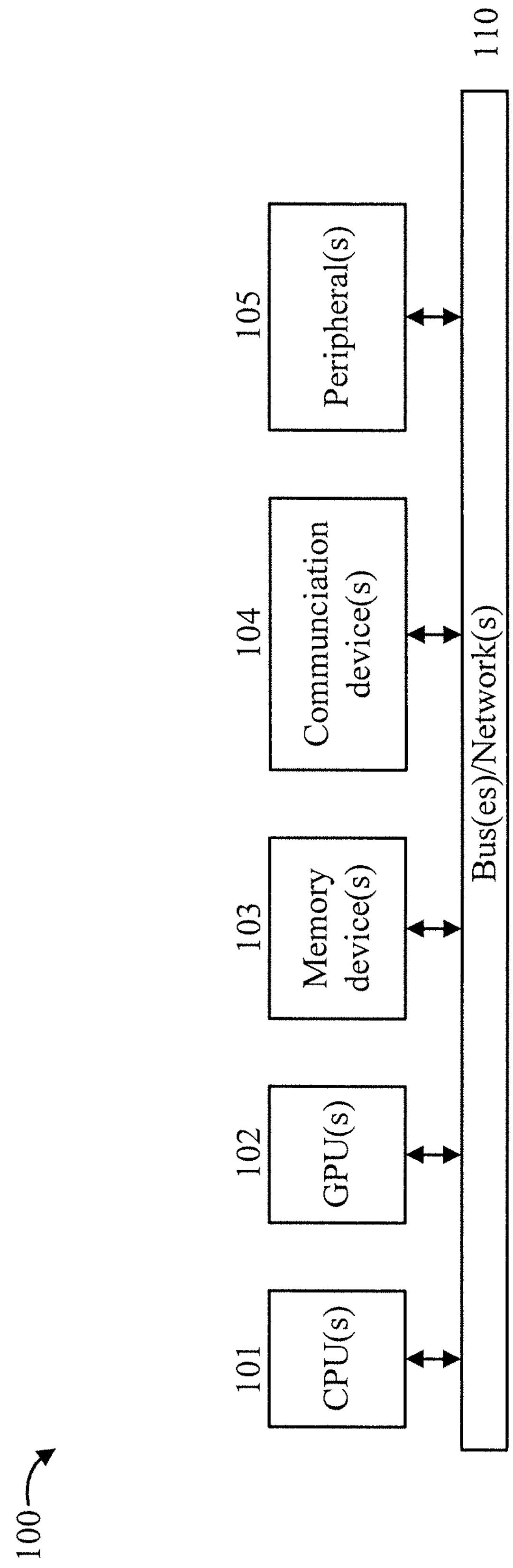
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100. Moreover, system 100 can be used to analyze results of the tagging and to perform actions responsive to tagging results. These and other uses of system 100 are readily determined by one of ordinary skill in the art given the teachings of the present invention provided herein, while maintaining the spirit of the present invention.

Figure 2:
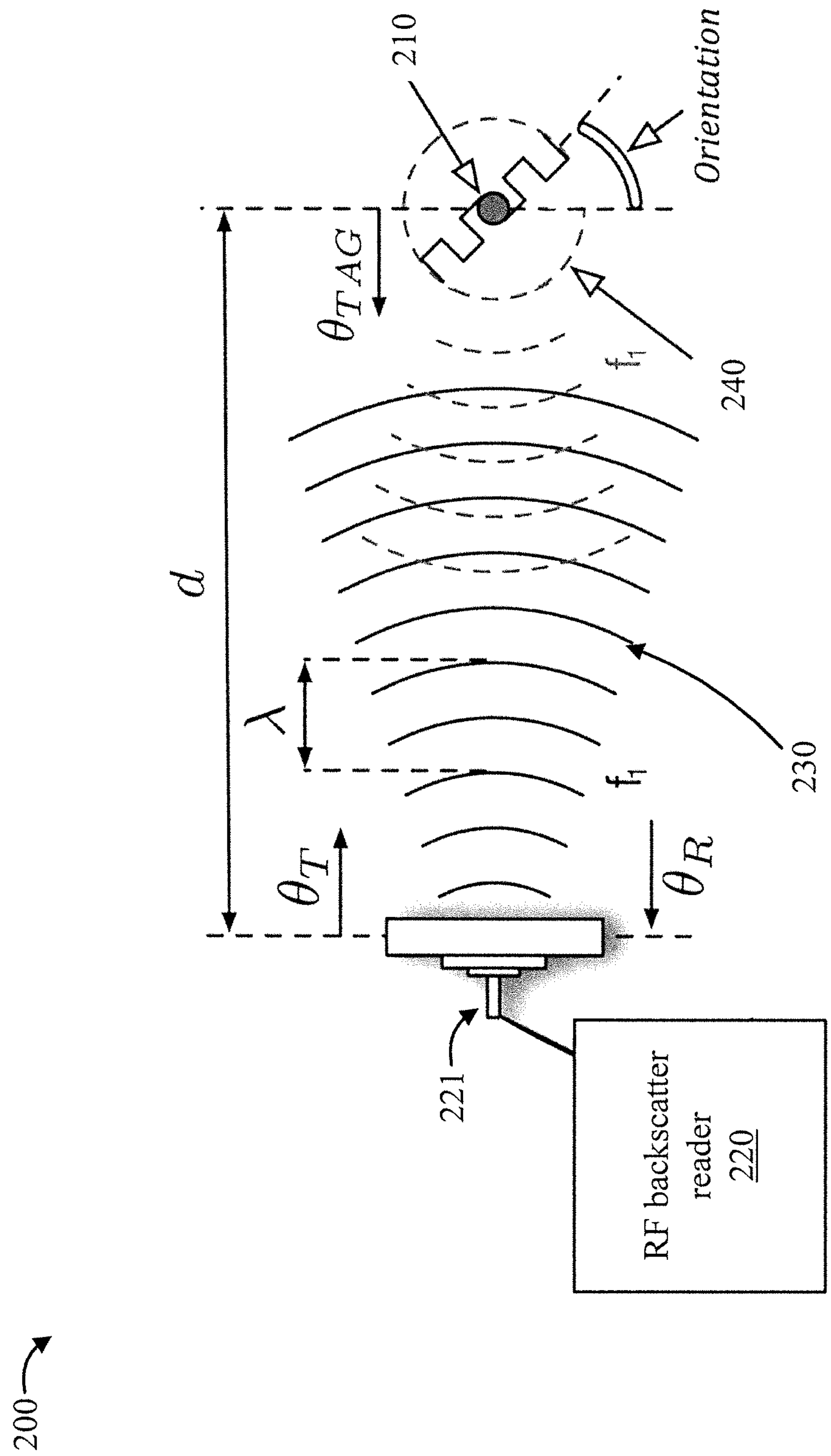
FIG. 2 is a block diagram showing an exemplary RF backscattering mechanism to which the present invention can be applied, in accordance with an embodiment of the present invention.

One or more embodiments of the present invention leverage passive radio frequency (RF) tags to tag and monitor everyday objects. Passive RF tags do not require a battery and cost a few cents each. The RF tags can be pasted onto objects and work by simply backscattering (reflecting) the signal energy sent by the transmitter, thereby eliminating the need to generate their own signal, as shown in FIG. 2. By modulating the state of the reflected signal, the tag is able to convey information stored in it, which could be related to the object that it tags. While the amount of information that can be delivered by a RF tag is limited (few tens to hundreds of Kbps for UHF tags), its low cost, small form factor and passive nature, allows for scalable tagging of everyday objects in consumer spaces.

FIG. 2 is a block diagram showing an exemplary RF backscattering mechanism 200 to which the present invention can be applied, in accordance with an embodiment of the present invention.

The backscattering mechanism 200 involves a passive RF tag 210 and an RF reader 220 with an RF antenna 221. One or more of the preceding elements can be communication devices and/or peripherals of processing system 100 of FIG. 1. While one exemplary tag is shown for the sake of illustration, the present invention is intended to be employed in an environment having many tags, where conventional approaches would suffer the aforementioned deficiencies overcome by embodiments of the present invention described herein with respect to reading the tags in such an environment.

In FIG. 2, d denotes a distance between the RF antenna 221 to the RF tag 210, $\lambda$, denotes a wavelength of the transmitted wave 230, $\theta_T$ denotes the phase of the transmit signal, $\theta_R$ denotes the phase of the backscattered received signal, and $f_1$ denotes a frequency of the transmitted wave 230 and also of the backscatter wave 240.

In operation, a Radio Frequency (RF) wave 230 is transmitted from the antenna 221 of the RF reader 220. Depending upon an orientation of the RF tag 210, the RF wave 230 reflects the RF wave 230 back to the RF antenna 221 as a backscatter wave 240. Moreover, by modulating the state of the reflected signal, i.e., the backscatter wave 240, the passive RF tag 210 is able to convey information stored in the passive RF tag 210.

A description will now be given regarding spatial reuse, in accordance with an embodiment of the present invention.

The main idea of spatial reuse is dedicated antennas configured to excite and read tags in smaller volumes than an entire volume as found (that is, the entire subsuming volume for all the tags), where the number of the tags in each of such smaller volumes is below a threshold. The success of this technique relies on how efficiently the entire reading environment can be partitioned into smaller chunks. Beamforming, power control and frequency allocations are among the main parameters that can control the efficiency of such partitioning. However, there could always be some overlap areas, e.g., at the edge of the partitions.

The transmitted signal from the antennas that correspond to different partitions may be generated in a central interrogator where each transmit antenna is equipped with a simpler transmit/receive capability, such that, for example, the transmit signal is only amplified so that the transmitted signal from the antenna has a certain power. The replies from the tag are then gathered and transmitted back to the central interrogator. Additional capabilities such as frequency conversion, queuing of the received replies, and base-band processing may also be added to the controlling hardware of each antenna.

In a different set up, the antennas for each chunk have a dedicated RF chain and processing unit and in effect each smaller volume or chunk is using a dedicated RFID reader. This approach can handle a much larger aggregate number of tags, but it has a drawback in that the number of RFID readers has to scale with the number of volumes or chunks.

A description will now be given regarding time splitting, in accordance with an embodiment of the present invention.

The technique of time splitting is very powerful and can be performed with most commercial RFID readers. It is noted that the success of the time splitting approach relies on the fact that it is possible to only trigger a given subset of RFID tags that are excited in the read range of the RFID reader. More precisely, once the RFID reader sends the query, many RFID tags that are in range can potentially be excited and woken up. However, the query allows only a given subset of such excited tags to respond. Hence, tag collision may be avoided.

A standard compliant RFID reader allows for defining up to two masks, where each mask defines a portion of a tag identification (ID) number known as an EPC (Electronic Product Code) to be considered. The value of each bit in the mask (or bit-mask) may be also defined. The combination of the value and the mask may be represented as a vector where each item has ternary value that belongs to the set {0, 1, x}. The mask has a length that is equal to the number of bits in the EPC. The value 0 at a given position of the mask means that the RFID tag is allowed to respond if the corresponding bit in the EPC of the tag is 0. Similarly, the value 1 at a given position of the mask means that only if the EPC of the tag at the corresponding location in EPC is 1, then the tag is included in the query and may respond. The value of 'x' means that the mask does not specify what should be the corresponding value in the EPC, so the EPC may have either 0 or 1 in the corresponding position.

A bit mask may be for example represented as [01xxx10xxx . . . xx11]. The combination of the bit masks in the form of logical 'OR' and logical 'AND' is also possible. An example of the time sharing is the case that for example 4096 tags are in the reading range of RFID while we would like to confine the number of the tags in each time slot to only 256. If we know that the tags for example share a given prefix of length 32, one can consider a 4 bit position in the rest of the EPC (not necessarily consecutive) and fill them with one of the 16 combination of ones and zeros (for example either (0,0,0,0) or (0,1,1,0), etc.) for each query time slot and cycle through these 16 combinations.

We note that the location of such bit positions are usually critical to be chosen correctly. These positions should be picked such that the number of the tags with a given zero and one combination in these bit positions are almost equal to the other cases where the combination of the zeros and ones in these positions are different. Of course, there is no guarantee in doing so unless we completely know the set of tags that are deployed in the environment. However, a rule of thumb is to use the bit values close to the least significant bit positions in the EPC. The reason is that most automated tag generation devices use almost a common prefix in the most significant bits of the EPC and automatically program each RFID tag with a unique EPC by varying the bits that are close to the least significant bits. Nonetheless, in some situations, a few bits (least significant bits) are kept fixed or reserved for parity. Hence, it is usually best to consider a set of least significant bit positions by skipping the first few positions.

A description will now be given regarding Simultaneous Multi-Port Reception (SMP), in accordance with an embodiment of the present invention.

SMP relies on a completely different technique to address the problem of reading a large number of tags in the environment. In SMP, two types of RF chains are considered as follows: a transmit RF chain; and a receive RF chain. Each uni-mode antenna is either connected to a transmit RF chain or receive RF chain. A dual-mode antenna is connected to both a transmit and receive RF chain, for example by using a circulate.

A uni-mode antenna that is connected to a transmit RF chain or a dual-mode antenna are capable of transmitting signal and performing query. A combination of transmit antennas (using any transmit antenna either uni-mode or dual-mode) may also be used to transmit a single stream, e.g., by using analog beamforming.

A uni-mode antenna that is connected to a receive RF chain or a dual-mode antenna are capable of receiving a signal and possibly decoding the received signal. A combination of receive antennas (using any transmit antenna either uni-mode or dual-mode) may also be used to receive a single stream, e.g., by using receive analog beamforming, diversity combining, or digital processing of the received signals.

SMP will be realized when a transmit signal from an antenna is at least received by two receive antennas. For example, consider a scenario that a uni-mode transmit antenna transmits a query and two uni-mode receive antennas at two different locations receive the same reply from the tag in response to the same query. In order to employ SMP, the transmit RF chains and receive RF chains all use a synchronized clock. This means that a very precise coherent detection is possible to be performed by either of the received antennas.

Figure 3:
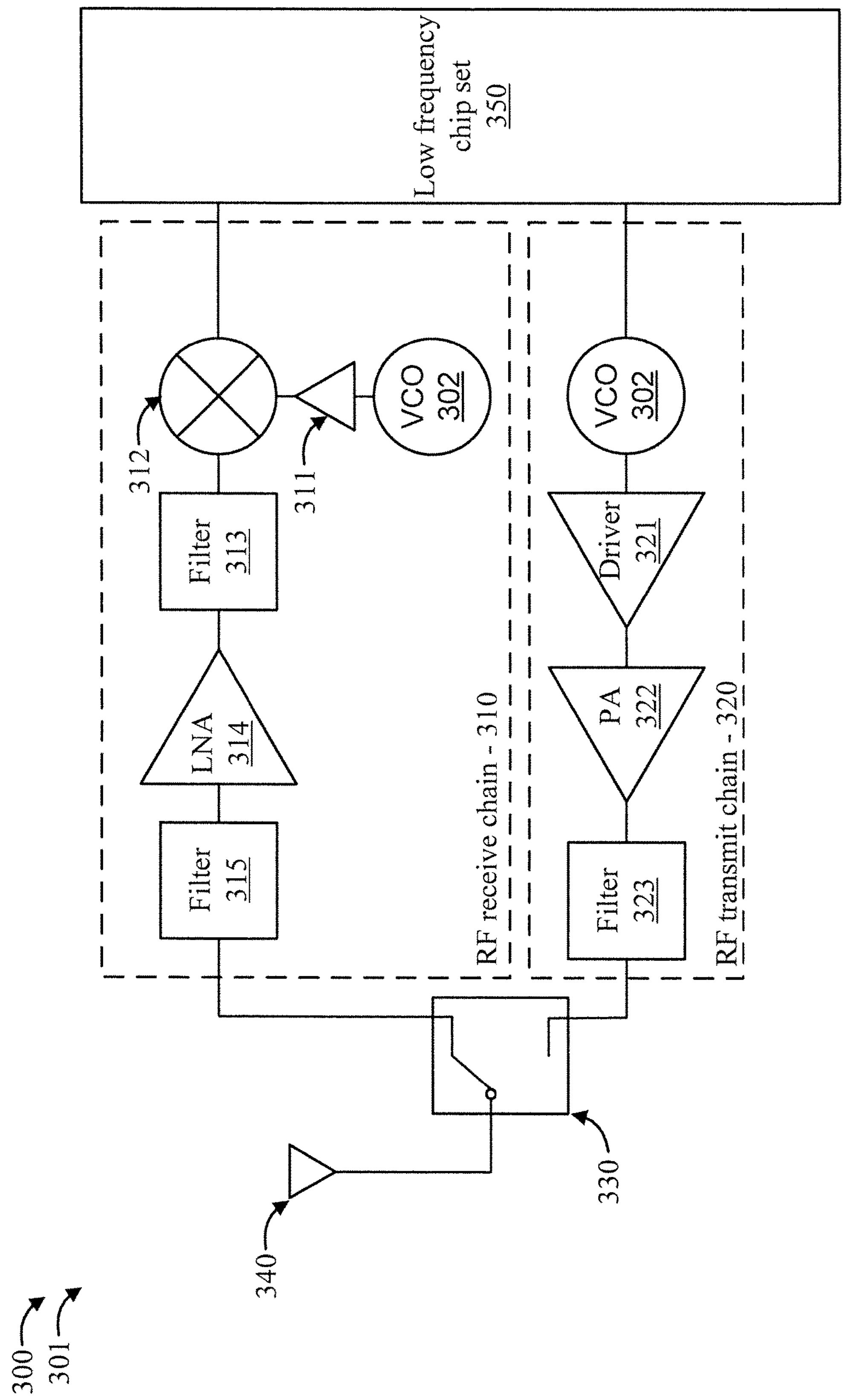
FIG. 3 is a schematic diagram of a communication system element having transmit and receive chains sharing the same VCO, in accordance with an embodiment of the present invention.
Figure 4:
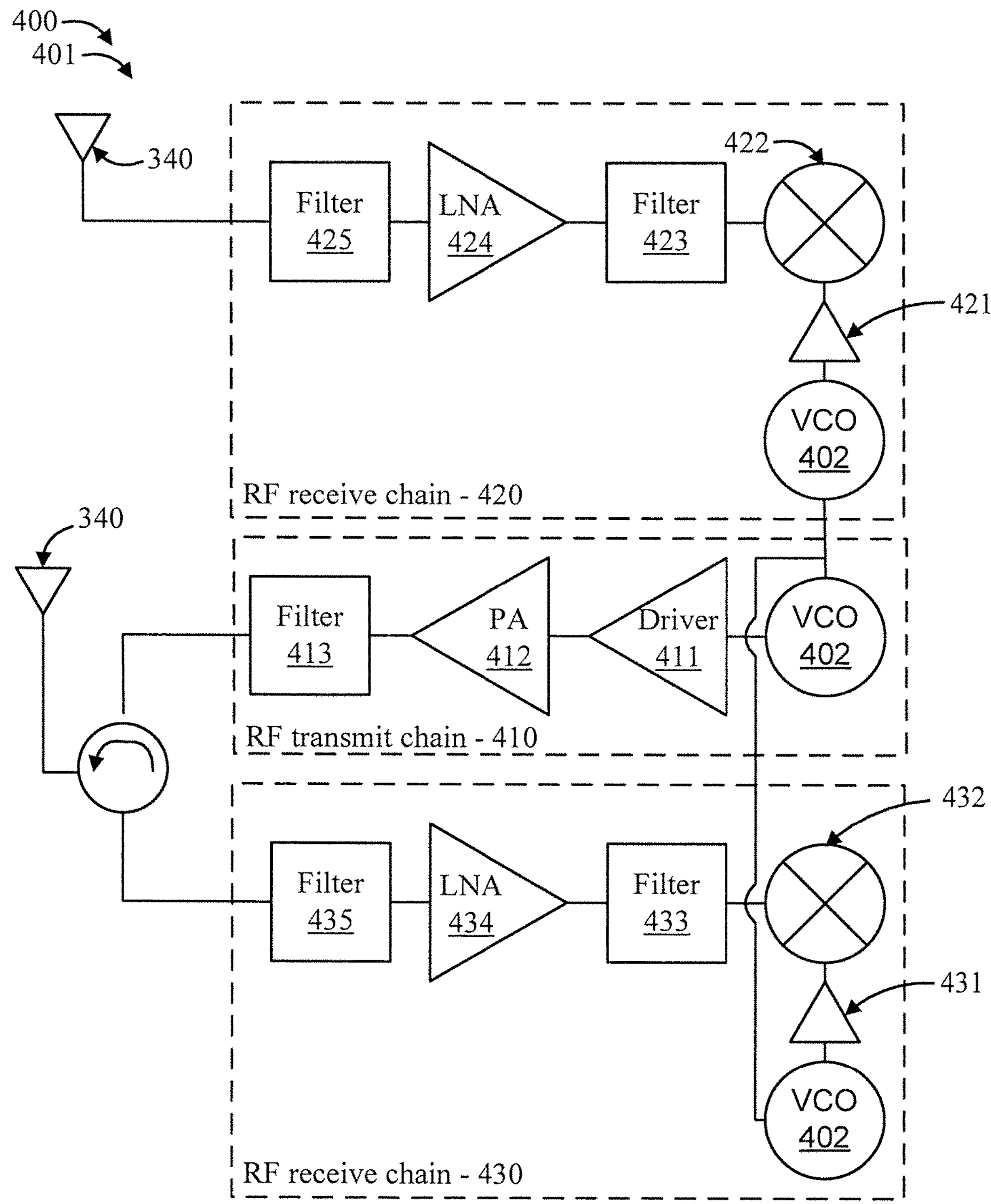
FIG. 4 is a block diagram showing another exemplary communication system element having transmit and receive chains sharing the same VCO, in accordance with an embodiment of the present invention.

FIGS. 3 and 4 are diagrams showing various communication system elements 300 and 400 that, together with many RF backscatter tags, form the same or different communication systems capable of implementing the present invention. Embodiments of communication systems will include one and preferably more than one of any of the elements 300 and/or 400.

FIG. 3 is a schematic diagram of a communication system element 300 having transmit and receive chains sharing the same VCO, in accordance with an embodiment of the present invention. If both RF chains are driven by the same VCO (oscillator), then the antennas may be even placed at different locations and there is no need for switching between the antennas. In a different setup, both RF chains may be attached to the same antenna by using a circulator. In the embodiment of FIG. 3, the VCOs are shared in having a common baseband originated from low frequency chips set 350.

In the embodiment of FIG. 3, the communication system element 300 is a single device 301 that includes both an RF transmit chain 310 and an RF receive chain 320. Embodiments of the present invention include one or preferably more than one communication element 300.

The RF receive chain 320 and the RF transmit chain 310 include a shared VCO 302.

The RF receive chain 310 includes a buffer 311, a mixer 312, a filter 313, a LNA 314, and a filter 315.

The RF transmit chain 320 includes a driver 321, a PA 322, and a filter 323.

The single device 301 includes a Single Pole Double Throw (SPDT) switch 330 for selecting between an active one of the RF chains. The single device 301 further includes an antenna 340 connected to the SPDT switch 330 for switching between transmitting and receiving responsive to a switch position.

The single device 301 includes a shared low frequency chip set 350.

FIG. 4 is a block diagram showing another exemplary communication system element 400 having transmit and receive chains sharing the same VCO, in accordance with an embodiment of the present invention. In configuration 400, a single transmit RF chain 410 is transmitting the interrogation signal and two different receive RF chains 420 and 430 collect the back scatter signals. All RF chains 420 and 430 are using the same oscillator or clock (VCO). As an example, the first receive RF chain 420 is using a separate antenna 421 while the second receive RF chain 430 is using the same antenna as the transmit RF chain 410 by employing a RF circulator.

In the embodiment of FIG. 4, the communication system element 400 is a single device 401 that includes an RF transmit chain 410, a first RF receive chain 420, and a second RF receive chain 430. Embodiments of the present invention include one or preferably more than one communication element 400.

The transmit RF chain 410, the first RF receive chain 420, and the second RF receive chain 430 include a shared VCO 402.

The first RF receive chain 420 includes a buffer 421, a mixer 422, a filter 423, a LNA 424, and a filter 425.

The second RF receive chain 430 includes a buffer 431, a mixer 432, a filter 433, a LNA 434, and a filter 435.

The transmit chain 410 includes a driver 411, a PA 412, and a filter 413.

The single device 401 includes a recirculator 440 for selecting between an active one of the RF chains. The single device 401 further includes an antenna 450 connected to the recirculator 440 for switching between transmitting and receiving responsive to a recirculator state (transmit versus receive).

The processing of the base band signal after the receive RF chain or before the transmit RF chain may be done in a single central location (e.g., shared low frequency chip set 350) or may be done in a distributed manner in different locations by using different processing units.

The processing after the RF chain of each receive antenna may be the same procedure that is performed in the receive RF chain of a dual-mode antenna where both RF chains are fed by the same clock generator board. We note that the synchronization should be at least at the symbol-level/basis. In some scenarios where the phase difference between the transmit and receive signal is used for localization, it is essential to have tighter synchronization which can be referred to as phase synchronized clock. It is usually possible to achieve such synchronization by using a single local oscillator that generates the clock and account for the phase shift in the transmission lines that are used to feed different RF chains.

A description will now be given regarding benefits of the SMP Technique, in accordance with an embodiment of the present invention.

The first benefit of the SMP technique is to reduce the time that is required to read RFID tags especially in areas with large number of tags in the reading range. This is particularly important if a given number of readings has to be collected to perform an algorithm. Since the read rate of SMP may be up to the factor of (number of receive RF chain) higher than for example the time splitting technique, hence, it can potentially collect the required number of readings faster (by the same factor).

Since the antennas may be placed in different locations, using multiple received signals provides different views of the signals that are back scattered from the tag. These observations can provide information about the location of the tag as well. For example, it is possible to perform a variation of a multi-latheration algorithm where the sum of distance of the tag from the transmit antenna and to the received antennas may be calculated by using the phase difference between the transmitted and received signals. Particularly, if the distance between the tag and the i-th transmitter is denoted by $D_i^T$ and the distance between the tag and the j-th receiver is denoted by $d_j^R$, the following simplified model can be used that relates the sum distance $D_i^T+d_j^R$ to the phase difference Øij between the transmitted signal from the antenna i and the received signal from the antenna j as follows:

$$D_i^T+d_j^R=\mathfrak{y}\,(\theta_i^T+\theta_j^R+\theta_{tag}+\varnothing_{ij}+2\pi k) \quad (1)$$

where k is an unknown integer that accounts for the ambiguity in phase difference, and $\theta_i^T$, $\theta_j^R$, and $\theta_{tag}$ are constant additive phase offset that is introduced by the i-th transmitter, j-th receiver, and the tag, respectively.

Another benefit of SMP technique is in moving scenarios and grouping of the tags based on their spatio-temporal proximity. In particular the fact that a simultaneous view of the back scattered signal from the tag is obtained in multiple receive antenna locations, this information is better representative of the spatio-temporal path of the tag and it is also easier to collect considerably larger number of readings at shorter time intervals. For example, a neural network may be used to learn the proximity between two tags or simply learning an embedding distance between two tag trajectories by looking at their readings in a given time interval. The SMP algorithm can arguably shorten the length of such intervals by an order of magnitude without sacrificing its accuracy.

Figure 5:
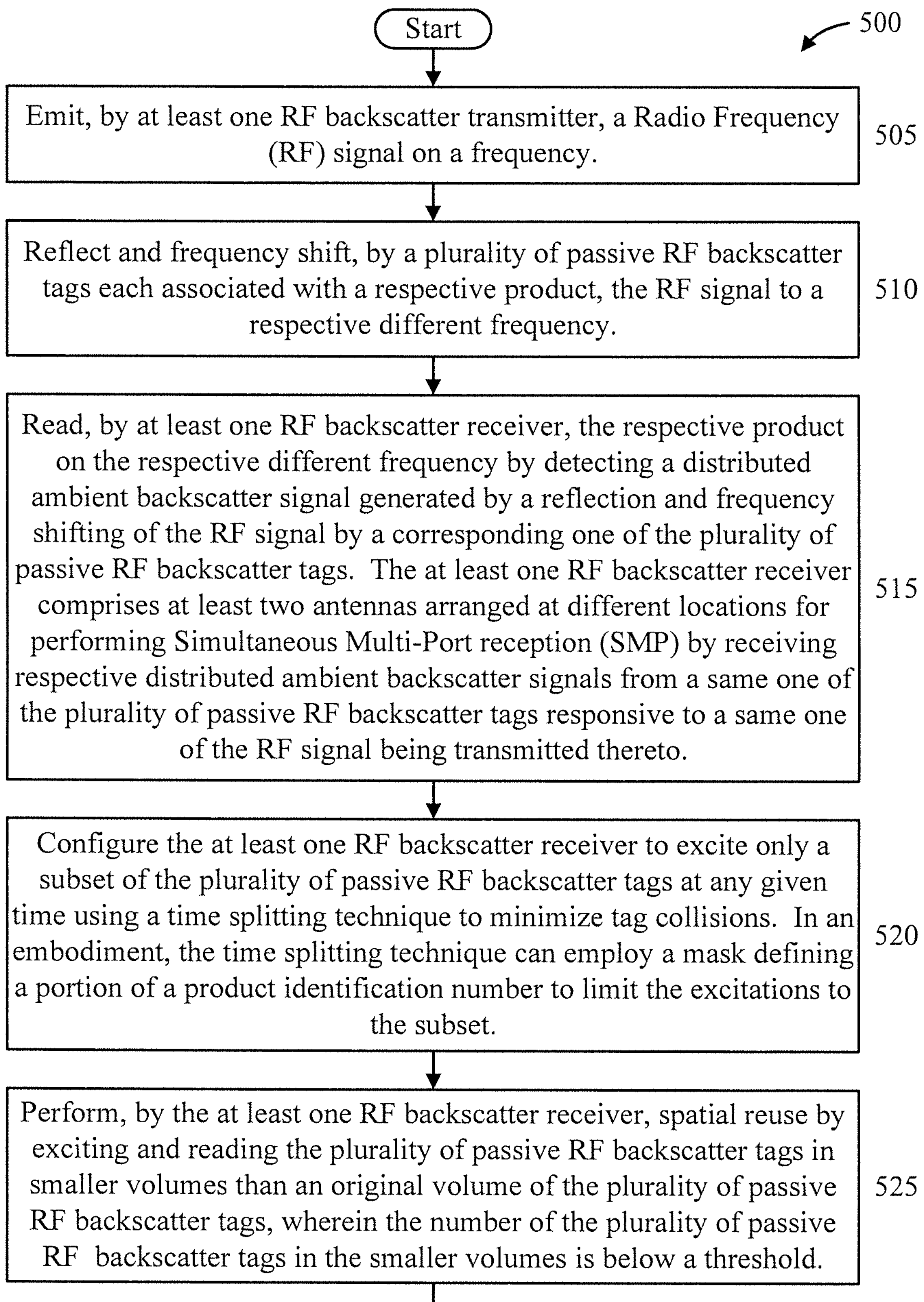
FIG. 5 is a flow diagram showing an exemplary method for crowded RFID reading, in accordance with an embodiment of the present invention.

FIG. 5 is a flow diagram showing an exemplary method 500 for crowded RFID reading, in accordance with an embodiment of the present invention. Method 500 can be performed using one or more of the communication system element 300 of FIG. 3 and/or the communication system element 400 of FIG. 4. Method 500 is intended to be performed in an environment having many tags, while providing optimum performance and minimum conflict if any.

At block 505, emit, by at least one RF backscatter transmitter, a Radio Frequency (RF) signal on a frequency.

At block 510, reflect and frequency shift, by a plurality of passive RF backscatter tags each associated with a respective product, the RF signal to a respective different frequency.

At block 515, read, by at least one RF backscatter receiver, the respective product on the respective different frequency by detecting a distributed ambient backscatter signal generated by a reflection and frequency shifting of the RF signal by a corresponding one of the plurality of passive RF backscatter tags. The at least one RF backscatter receiver comprises at least two antennas arranged at different locations for performing Simultaneous Multi-Port reception (SMP) by receiving respective distributed ambient backscatter signals from a same one of the plurality of passive RF backscatter tags responsive to a same one of the RF signal being transmitted thereto. Each of the at least RF backscatter transmitter and the at least one RF backscatter receiver include a respective synchronized clock for the SMP.

At block 520, configure the at least one RF backscatter receiver to excite only a subset of the plurality of passive RF backscatter tags at any given time using a time splitting technique to minimize tag collisions. In an embodiment, the time splitting technique can employ a mask defining a portion of a product identification number to limit the excitations to the subset.

At block 525, perform, by the at least one RF backscatter receiver, spatial reuse by exciting and reading the plurality of passive RF backscatter tags in smaller volumes than an original volume of the plurality of passive RF backscatter tags, wherein the number of the plurality of passive RF backscatter tags in the smaller volumes is below a threshold.

In an embodiment, one or more of blocks 515, 520, and 525 can be performed concurrently.

According to an aspect of the present invention, a product tagging system includes at least one RF backscatter transmitter configured to emit a Radio Frequency (RF) signal on a frequency. The product tagging system further includes a plurality of passive RF backscatter tags, each associated with a respective product and configured to reflect and frequency shift the RF signal to a respective different frequency. The product tagging system also includes at least one RF backscatter receiver configured to read the respective product on the respective different frequency by detecting a distributed ambient backscatter signal generated by a reflection and frequency shifting of the RF signal by a corresponding one of the plurality of passive RF backscatter tags.

The product tagging system as described above, wherein the at least one RF backscatter receiver includes at least two antennas for performing Simultaneous Multi-Port reception (SMP) by receiving respective distributed ambient backscatter signals from a same one of the plurality of passive RF backscatter tags responsive to a same one of the RF signal being transmitted thereto. Each of the at least RF backscatter transmitter and the at least one RF backscatter receiver include a respective synchronized clock for the SMP.

The product tagging system as described above, wherein the at least one RF backscatter receiver includes a set of spatial reuse dedicated antennas configured to perform spatial reuse by exciting and reading the plurality of passive RF backscatter tags in smaller volumes than an original volume of the plurality of passive RF backscatter tags, wherein the number of the plurality of passive RF backscatter tags in the smaller volumes is below a threshold.

The product tagging system as described above, wherein beamforming, power control, and frequency allocation techniques are used to control an efficiency of a partitioning of the original volume into the smaller volumes.

The product tagging system as described above, wherein the at last one RF backscatter receiver determines a spatio-temporal path of the corresponding one of the plurality of RF backscatter tags based on a spatio-temporal proximity to other ones of the plurality of RF backscatter tags.

The product tagging system as described above, wherein the at least one RF backscatter transmitter includes a combination of transmit antennas, configured to transmit two streams that are at least synchronized up to a frame level.

The product tagging system as described above, wherein at least RF signals transmitted from two of the transmit antennas of the at least one RF backscatter transmitter are symbol level synchronized.

The product tagging system as described above, wherein at least RF signals transmitted from two of the transmit antennas of the at least one RF backscatter transmitter are phase level synchronized.

The tagging system as described above, wherein the RF transmitter transmits query signals that are frame synchronized from at least two of the transmit antennas.

The tagging system as described above, wherein the at least one RF backscatter receiver includes a first and a second RF backscatter receiver, and wherein the at least one RF backscatter transmitter and the first and the second RF backscatter receivers are included in a single device having (a) a dual-mode antenna, connected to the at least one RF backscatter transmitter and the first RF backscatter receiver, configured to transmit the RF signal and receive one of respective distributed ambient backscatter signals, and (b) a non-transmitting uni-mode antenna, connected to the second RF backscatter transmitter, configured to receive another one of the respective distributed ambient backscatter signals.

The tagging system as described above, wherein the at least one RF backscatter receiver includes a first and a second RF backscatter receiver. The first and the second backscatter receiver decode distributed ambient backscatter signals from at least two different one of the plurality of passive RF backscatter tags.

The tagging system as described above, wherein the at least one RF backscatter receiver includes a first and a second RF backscatter receiver. The first and the second backscatter receiver jointly decode the distributed ambient backscatter signal from a particular one of the plurality of passive RF backscatter tags.

The tagging system as described above, wherein the at least one RF backscatter receiver is configured to excite only a subset of the plurality of passive RF backscatter tags at any given time using a time splitting technique to minimize tag collisions.

The tagging system as described above, wherein the time splitting technique employs a mask defining a portion of a product identification number.

The tagging system as described above, wherein a position of the respective product is estimated by a position of a corresponding one of the plurality of passive RF backscatter tags. The position of the corresponding one of the plurality of passive RF backscatter tags is estimated by using RF signals received at least two receive antennas arranged at different locations for performing Simultaneous Multi-Port reception (SMP) by receiving respective distributed ambient backscatter signals from the corresponding one of the plurality of passive RF backscatter tags responsive to a same one of the RF signals being transmitted thereto.

According to another aspect of the present invention, a product tagging system includes at least one RF backscatter transmitter configured to emit a Radio Frequency (RF) signal on a frequency. The product tagging system further includes a plurality of passive RF backscatter tags, each associated with a respective product and configured to backscatter a reply in response to a transmission from the at least one RF backscatter transmitter. The product tagging system also includes at least one RF backscatter receiver configured to read data for the respective product by detecting a distributed ambient backscatter signal generated by backscattering the RF signal by a corresponding one of the plurality of passive RF backscatter tags. The at least one RF backscatter receiver includes at least two antennas for performing Simultaneous Multi-Port reception (SMP) by receiving respective distributed ambient backscatter signals from a same one of the plurality of passive RF backscatter tags responsive to a same one of the RF signal being transmitted thereto. Each of the at least RF backscatter transmitter and the at least one RF backscatter receiver include a respective synchronized clock for the SMP.

The product tagging system as described above, wherein the at least one RF backscatter receiver includes a set of spatial reuse antennas configured to perform spatial reuse by exciting and reading the plurality of passive RF backscatter tags in smaller volumes than an original volume of the plurality of passive RF backscatter tags. The number of the plurality of passive RF backscatter tags in the smaller volumes is below a threshold.

The product tagging system as described above, wherein beamforming, power control, and frequency allocation techniques are used to control an efficiency of a partitioning of the original volume into the smaller volumes.

The product tagging system as described above, wherein the at last one RF backscatter receiver determines a spatio-temporal path of the corresponding one of the plurality of passive RF backscatter tags based on a spatio-temporal proximity to other ones of the plurality of passive RF backscatter tags.

The product tagging system as described above, wherein the at least one RF backscatter receiver includes a non-transmitting uni-mode antenna, from among the two antennas, configured to receive the distributed ambient backscatter signal.

The product tagging system as described above, wherein the at least one RF backscatter transmitter and the at least one RF backscatter receiver are included in a single device having a dual-mode antenna, from among the two antennas, capable of transmitting the RF signal and receiving the distributed ambient backscatter signal.

The product tagging system as described above, further including a circulator, connected to the at least one RF backscatter transmitter, the at least one RF backscatter receiver, and the dual-mode antenna, configured to connect the received signal at the antenna to the at least one RF backscatter receiver and transmit the signal provided by the at least one RF backscatter transmitter from the dual-mode antenna.

The product tagging system as described above, further including a single pole, double throw, switch, connected to the at least one RF backscatter transmitter, the at least one RF backscatter receiver, and the dual-mode antenna, configured to switch between transmitting and receiving responsive to a switch position.

The product tagging system as described above, wherein the at least one RF backscatter transmitter includes a combination of transmit antennas, configured to transmit a single stream, and selected from the group consisting of uni-mode antennas and dual-mode antennas.

The product tagging system as described above, wherein the combination of transmit antennas collectively transmit the single stream using analog beamforming.

The product tagging system as described above, wherein the at least one RF backscatter transmitter includes a combination of transmit antennas, configured to transmit two streams that are at least synchronized up to a frame level.

The product tagging system as described above, wherein at least the RF signal transmitted from two of the transmit antennas of the at least one RF backscatter transmitter are symbol level synchronized.

The product tagging system as described above, wherein at least RF signals transmitted from two of the transmit antennas of the at least one RF backscatter transmitter are phase level synchronized.

The product tagging system as described above, wherein the at least one RF backscatter transmitter transmits query signals that are frame synchronized from at least two of the transmit antennas.

The product tagging system as described above, wherein the at least one RF backscatter receiver include a first and a second RF backscatter receiver, and wherein the at least one RF backscatter transmitter and the first and the second RF backscatter receivers are included in a single device having (a) a dual-mode antenna, connected to the at least one RF backscatter transmitter and the first RF backscatter receiver, configured to transmit the RF signal and receive one of the respective distributed ambient backscatter signals, and (b) a non-transmitting uni-mode antenna, connected to the second RF backscatter receiver, configured to receive another one of the respective distributed ambient backscatter signals.

The product tagging system as described above, wherein the at least one RF backscatter receiver includes a first and a second RF backscatter receiver. The first and the second backscatter receiver decode backscatter signals from at least two different ones of the plurality of passive RF backscatter tags.

The product tagging system as described above, wherein the at least one RF backscatter receiver includes a first and a second RF backscatter receiver, and wherein the first and the second backscatter receiver jointly decode backscatter signal from a given one of the plurality of passive RF backscatter tags.

The product tagging system as described above, wherein the at least one RF backscatter receiver is configured to excite only a subset of the plurality of passive RF backscatter tags at any given time using a time splitting technique to minimize tag collisions.

The product tagging system as described above, wherein the time splitting technique employs a mask defining a portion of a product identification number.

According to yet another aspect of the present invention, a method of localizing an RFID tag includes transmitting, by at least one RF backscatter transmitter, a Radio Frequency (RF) signal. The method further includes receiving, by a plurality of RF backscatter receivers, a backscattered signal from a passive RF backscatter tag. At least one of the plurality of RF backscatter receivers and the at least one RF backscatter transmitter are phase synchronized. At least two receive antennas are arranged at different locations for performing Simultaneous Multi-Port reception (SMP) by receiving respective distributed ambient backscatter signals from the passive RF backscatter tag responsive to a same one of RF signals being transmitted thereto. The at least one RF backscatter transmitter and at least one of the plurality of RF backscatter receivers include a respective synchronized clock for the SMP.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A product tagging system, comprising:

at least one RF backscatter transmitter configured to emit a Radio Frequency (RF) signal on a frequency;

a plurality of passive RF backscatter tags, each associated with a respective product and configured to backscatter a reply in response to a transmission from the at least one RF backscatter transmitter; and at least one RF backscatter receiver configured to read data for the respective product by detecting a distributed ambient backscatter signal generated by backscattering the RF signal by a corresponding one of the plurality of passive RF backscatter tags, wherein the at least one RF backscatter receiver comprises at least two antennas for performing Simultaneous Multi-Port reception (SMP) by receiving respective distributed ambient backscatter signals from a same one of the plurality of passive RF backscatter tags responsive to a same one of the RF signal being transmitted thereto, and wherein each of the at least one RF backscatter transmitter and the at least one RF backscatter receiver comprise a respective synchronized clock for the SMP.

2. The product tagging system of claim 1, wherein the at least one RF backscatter receiver comprises a set of spatial reuse antennas configured to perform spatial reuse by exciting and reading the plurality of passive RF backscatter tags in smaller volumes than an original volume of the plurality of passive RF backscatter tags, wherein the number of the plurality of passive RF backscatter tags in the smaller volumes is below a threshold.

3. The product tagging system of claim 2, wherein beamforming, power control, and frequency allocation techniques are used to control an efficiency of a partitioning of the original volume into the smaller volumes.

4. The product tagging system of claim 1, wherein the at last one RF backscatter receiver determines a spatio-temporal path of the corresponding one of the plurality of passive RF backscatter tags based on a spatio-temporal proximity to other ones of the plurality of passive RF backscatter tags.

5. The product tagging system of claim 1, wherein the at least one RF backscatter receiver comprises a non-transmitting uni-mode antenna, from among the two antennas, configured to receive the distributed ambient backscatter signal.

6. The product tagging system of claim 1, wherein the at least one RF backscatter transmitter and the at least one RF backscatter receiver are comprised in a single device having a dual-mode antenna, from among the two antennas, capable of transmitting the RF signal and receiving the distributed ambient backscatter signal.

7. The product tagging system of claim 6, further comprising a circulator, connected to the at least one RF backscatter transmitter, the at least one RF backscatter receiver, and the dual-mode antenna, configured to connect the received signal at the antenna to the at least one RF backscatter receiver and transmit the signal provided by the at least one RF backscatter transmitter from the dual-mode antenna.

8. The product tagging system of claim 6, further comprising a single pole, double throw, switch, connected to the at least one RF backscatter transmitter, the at least one RF backscatter receiver, and the dual-mode antenna, configured to switch between transmitting and receiving responsive to a switch position.

9. The product tagging system of claim 1, wherein the at least one RF backscatter transmitter comprises a combination of transmit antennas, configured to transmit a single stream, and selected from the group consisting of uni-mode antennas and dual-mode antennas.

10. The product tagging system of claim 9, wherein the combination of transmit antennas collectively transmit the single stream using analog beamforming.

11. The product tagging system of claim 1, wherein the at least one RF backscatter transmitter comprises a combination of transmit antennas, configured to transmit two streams that are at least synchronized up to a frame level.

12. The product tagging system of claim 11, wherein at least the RF signal transmitted from two of the transmit antennas of the at least one RF backscatter transmitter are symbol level synchronized.

13. The product tagging system of claim 11, wherein at least RF signals transmitted from two of the transmit antennas of the at least one RF backscatter transmitter are phase level synchronized.

14. The product tagging system of claim 11, wherein the at least one RF backscatter transmitter transmits query signals that are frame synchronized from at least two of the transmit antennas.

15. The product tagging system of claim 14, wherein the time splitting technique employs a mask defining a portion of a product identification number.

16. The product tagging system of claim 1, wherein the at least one RF backscatter receiver comprises a first and a second RF backscatter receiver, and wherein the at least one RF backscatter transmitter and the first and the second RF backscatter receivers are comprised in a single device having:

a dual-mode antenna, from among the two antennas, connected to the at least one RF backscatter transmitter and the first RF backscatter receiver, configured to transmit the RF signal and receive one of the respective distributed ambient backscatter signals; and a non-transmitting uni-mode antenna, from among the two antennas, connected to the second RF backscatter receiver, configured to receive another one of the respective distributed ambient backscatter signals.

17. The product tagging system of claim 1, wherein the at least one RF backscatter receiver comprises a first and a second RF backscatter receiver, and wherein the first and the second backscatter receiver decode the respective distributed ambient backscatter signals from at least two different ones of the plurality of passive RF backscatter tags.

18. The product tagging system of claim 1, wherein the at least one RF backscatter receiver comprises a first and a second RF backscatter receiver, and wherein the first and the second backscatter receiver jointly decode the distributed ambient backscatter signal from a given one of the plurality of passive RF backscatter tags.

19. The product tagging system of claim 1, wherein the at least one RF backscatter receiver is configured to excite only a subset of the plurality of passive RF backscatter tags at any given time using a time splitting technique to minimize tag collisions.

20. A method of localizing an RFID tag, comprising:

transmitting, by at least one Radio Frequency (RF) backscatter transmitter, a RF signal; and receiving, by a plurality of RF backscatter receivers, a backscattered signal from a passive RF backscatter tag, wherein at least one of the plurality of RF backscatter receivers and the at least one RF backscatter transmitter are phase synchronized, wherein at least two receive antennas are arranged at different locations for performing Simultaneous Multi-Port reception (SMP) by receiving respective distributed ambient backscatter signals from the passive RF backscatter tag responsive to a same one of RF signals being transmitted thereto, and wherein the at least one RF backscatter transmitter and at least one of the plurality of RF backscatter receivers comprise a respective synchronized clock for the SMP.

* * * * *